United States Patent [19]

Walston

[11] Patent Number: 5,113,588
[45] Date of Patent: May 19, 1992

[54] ISOMORPHIC TRAILER HITCH ALIGNMENT GUIDE DEVICE

[75] Inventor: Bob E. Walston, Rt. 8, Box 348, Jacksonville, Tex. 75766

[73] Assignees: Bob Walston; Charles Walters, both of Jacksonville, Tex.

[21] Appl. No.: 813,486

[22] Filed: Dec. 26, 1991

[51] Int. Cl.$^5$ .............................. G02B 5/06
[52] U.S. Cl. ........................ 33/264; 280/477
[58] Field of Search ............... 280/477; 33/263, 264, 33/241, 242, 243, 297, 233, 234, 286, 252

[56] References Cited

U.S. PATENT DOCUMENTS

| | | |
|---|---|---|
| 2,984,011 | 5/1961 | Hamilton . |
| 3,015,162 | 1/1962 | Bohnet . |
| 3,720,100 | 3/1973 | Schlegel . |
| 3,765,703 | 10/1973 | Voelkierding . |
| 3,818,599 | 6/1974 | Tague . |
| 3,889,384 | 6/1975 | White . |
| 4,054,302 | 10/1977 | Campbell . |
| 4,169,610 | 10/1979 | Pauffer . |
| 4,285,138 | 8/1981 | Berry . |

FOREIGN PATENT DOCUMENTS 28973 of 1913 United Kingdom ............... 33/233

Primary Examiner—Harry N. Haroian
Attorney, Agent, or Firm—F. Rhett Brockington

[57] ABSTRACT

A trailer hitch alignment guide device, for a ball and socket hitch, wherein the guides can be mounted either to the rear or side, wherein the sighting elements on the guides are visually emblematic of the coupling elements, where one sighting element is isomorphic of the hitch ball and the other sighting element is isomorphic of the socket, and where the sighting elements are scribed with lines which visually amplify deviations from alignment.

5 Claims, 2 Drawing Sheets

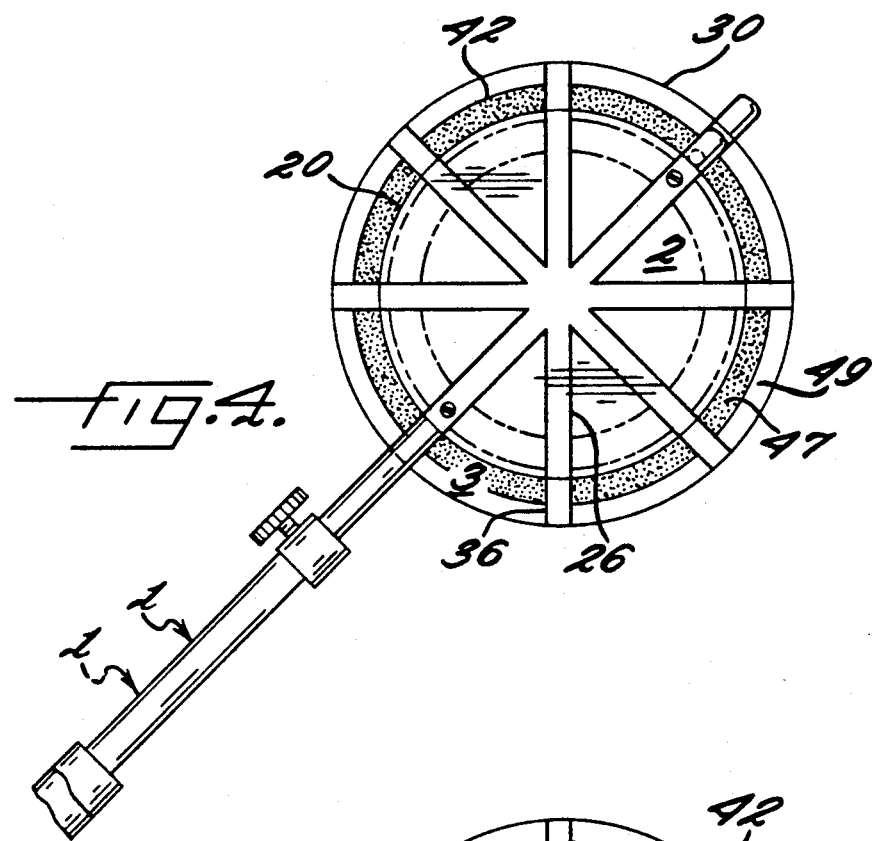
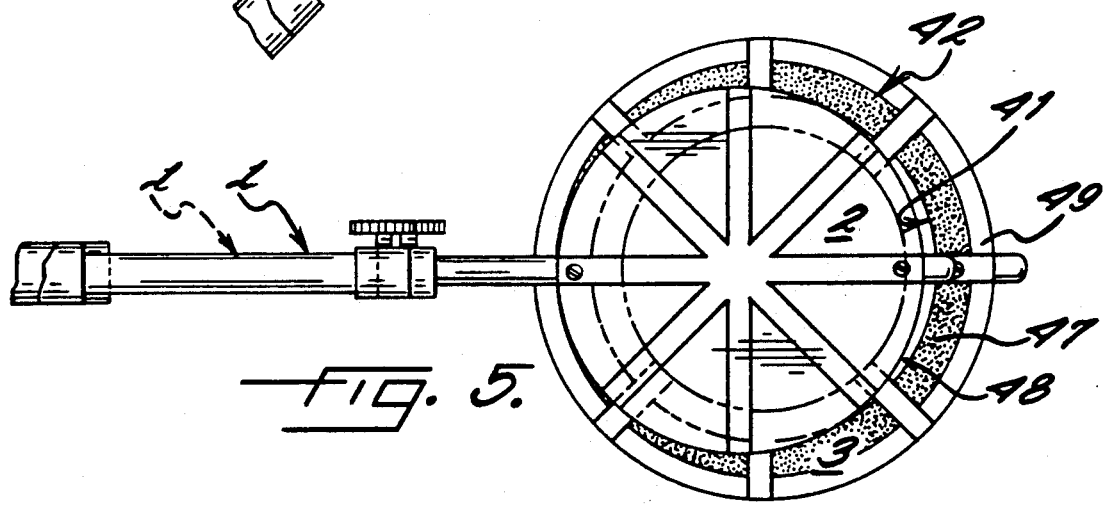

ISOMORPHIC TRAILER HITCH ALIGNMENT GUIDE DEVICE

BACKGROUND

The invention relates generally to trailer hitch guide devices, and more particularly to trailer hitch visual alignment guide devices which remotely emblematically represent the hitch coupling element and the trailer coupling element.

In coupling a towing vehicle, such as an automobile to a towed vehicle, such as a trailer, it is commonplace to utilize a a hitch having a hitch ball on the rear of the towing vehicle and a tongue having a socket on the front of the towed vehicle. To couple, the towing vehicle is backed up so as to place the hitch ball beneath the socket, after which the tongue is lowered such that the socket slides over and engages the hitch ball, therein coupling the towing vehicle to the towed vehicle.

Heretofore, the operation of coupling between the towing vehicle and the towed vehicle has proven difficult, especially if performed single-handedly, because in most cases both the hitch ball and the socket are not within the field of vision of the driver. A number of trailer hitch guides have been described in the literature which aid the driver to align the hitch ball with the socket of the towed vehicle. Tague U.S. Pat. No. 3,818,599 discloses a sighting device which consists of a pair of telescoping antenna, each capped with a sighting tip, where the sighting tips are plumb, respectfully, over the center of the socket and the center of the ball. The driver backs the vehicle up until the two sighting tips just touch one another. Voelkerding's U.S. Pat. No. 3,765,703 invention is very similar in concept to Tague's. Berry's U.S. Pat. No. 4,285,138 again is very similar, except that his device includes plumb lines as well as the antenna fitted with sighting tips. Campbell's U.S. Pat. No. 4,054,302 version of the trailer hitch guide antenna are electrically lightable. Other trailer hitch guide devices that employ sighting tips extended such that the sighting tips are plumb to the coupling elements, include Hamilton U.S. Pat. No. 2,984,011, Schlegel U.S. Pat. No. 3,720,000, White U.S. Pat. No. 3,889,384, Pauffer U.S. Pat. No. 4,169,610, and Bohnet U.S. Pat. No. 3,015,162. The sighting tips in these patents are usually spherical in shape.

The application of the prior art, in general, relies heavily on the driver being able to align the two sighting tips which are spherical. Billiards is a game, which also relies on the alignment of two spheres, and to the uninitiated player, this is not a simple task. This difficulty was recognized by Lehtisaari, and in his patent, U.S. Pat. No. 3,918,746, entitled "trailer and towing vehicle coupler guide" the spherical sighting tips are replaced with a V and a post shaped combination of sighting tips.

The act of aligning the towing vehicle with the towed vehicle can be described spatially in terms of movement along the X and Y axis within the horizontal plane defined by the ground. The X axis can be arbitrarily assigned to define leftward and rightward turning movement of the wheels, and the Y axis can arbitrarily be assigned to define the frontward-backward motion of the towing vehicle. The X axis, therefore, defines the side to side orientation of the alignment of the hitch ball with the socket, and the Y axis then would define the front to rear orientation of the alignment. The prior art teaches that front to rear alignment is obtained when the two sighting tips first contact as the towing vehicle approaches the towed vehicle. An improved guide device would be one where the guide does not require a collision between the sighting tips to determine their relative position. The prior art also teaches that the sighting elements of the guide device are positioned to the rear of the towing vehicle. For vehicles where this view is obscured, such as a station wagon filled with luggage or a loaded truck bed, the driver's point of reference would be lost, and the trailer hitch guide devices would be of little use. An improved trailer hitch guide device would be one where the driver would have a choice of aligning the hitch and the socket either using the sighting elements of the guide device positioned to the side of the towing vehicle, or positioned to the rear of the towing vehicle.

SUMMARY OF THE INVENTION

The instant invention is a device which facilitates the process of coupling a towing vehicle, equipped with a male coupling element consisting of a hitch having a ball, to a towed vehicle (trailer), equipped with a female coupling element consisting of a tongue having a receiving socket, wherein the coupling process is facilitated in the act of aligning the coupling elements such that the ball is beneath the socket. The device consists of a pair of guides, which remotely emblematically represent the coupling elements and their relative position throughout the process of alignment of the coupling elements. One of the guides, the socket guide, has a sighting element that is emblematic of the socket, and so is designated the female sighting element, wherein the female sighting element is mounted on an extension rod that is fitted to a mounting base having a pivoting-locking means. The socket guide is mounted on the towed vehicle, usually on the tongue near the socket. The other guide, the ball guide, has a sighting element that is emblematic of the ball on the hitch of the towing vehicle, and so is designated the male sighting element, wherein the male sighting element is mounted on an extension rod that is fitted to a mounting base having a pivoting-locking means. The ball guide is mounted toward the rear of the towing vehicle. The sighting elements of the guides are contrived such that when they are aligned, and viewed in an overlaid aligned manner, the male sighting element is complementary to the female sighting element, and their composite image contains radiating crossing lines which visually amplify deviations from alignment. The ball and socket guides are set so that when the ball is beneath the socket, as would be the case just prior to lowering the socket down onto the ball or just after elevating the socket off the ball, the male sighting element is aligned in front of and coaxial with the female sighting element. The sighting elements are positioned to the rear (either centrally or to the side) of the towing vehicle such that both sighting elements can be clearly seen, either through the rear view mirror or side view mirror. The guides are set so that the extension rods and the mounting bases are secure to movement. When viewed by the driver the sighting elements are substantially a pair of highly visible targets which face frontward in the vertical plane. The male-female design of the sighting elements makes them instrinsically easier to align than say, a pair of antenna having sighting tips that are spherical. Deviations from alignment are further visually amplified by the inclusion of crossing lines scribed on the sighting elements. The crossing lines act like cross hairs on a telephoto lens. They originate at the epicenter of the male sighting element and radiate outwardly, therein defining axial differences in the alignment. Vertical lines amplify deflections from the Y axis in the horizontal plane defined by the ground. That is, if there is misalignment, for instance the hitch ball is to the right of the socket, then the vertical crossing line on the male sighting element would correspondingly be displaced to the left of the corresponding vertical crossing line on the female sighting element. The driver looking through his mirror would see the mirror image, and the vertical crossing line would appear to be deflected to the right of the corresponding vertical crossing line on the female sighting element. On the other hand, if the driver had misaligned to the left, then the male sighting element would be displaced to the right relative to the female sighting element, as viewed straight on, and the mirror image would have the male sighting element to the left. The driver seeing the misalignment, would take his natural appropriate course of corrective action, turning the steering wheel to the right. Horizontal crossing lines amplify deviations of height of the hitch ball from the socket. Under normal circumstances there would not be a deviation, as both the towing vehicle and the towed vehicle are supported in the same horizontal plane by the ground. There are circumstances, however, when the horizontal crossing lines will be out of alignment because the height of the tongue has been changed after the sighting elements were set. For instance, if the sighting elements were aligned when the socket was one inch off the hitch ball, and then the socket was cranked lower for long term storage, then the horizontal crossing line on the female sighting element would be lower by one inch than the corresponding horizontal crossing line on the male sighting element. The male sighting element could be used at a later date to reset the tongue height when preparing to re-hitch. In addition to having crossing lines to aid in the visual alignment along the Y axis and vertical axis, the sighting elements are designed so as to show depth of field, heretofore defined as the X axis, such that the driver can judge how far the hitch ball on the towing vehicle is in front of or behind the socket. The distance between the male sighting element and the female sighting element can be quantified by exploiting the phenomena that as the male sighting element moves toward the female sighting element, the female sighting element will appear, to the driver, to become larger the closer it is approached. The female sighting element is scribed with a series of parametric lines which represent the ecliptic projection of the planar image of the male sighting element onto the female sighting element; as would be seen by the driver. The parametric lines are representative of a shadow that would be cast by the male sighting element at various distances from the female sighting element, wherein the male sighting element partially eclipses the female sighting element. The parametric lines are scribed such that at a prescribed distance separating the male and female sighting elements there is alignment of the hitch ball beneath the socket. If the hitch ball is further away than the prescribed distance, then a more radial parametric line will be obscured by the eclipsing male sighting element. On the other hand, when, the hitch ball of the towing vehicle is too close to the socket of the towed vehicle, then a less radial parametric line will become visible to the driver. The parametric lines create a visual quantification of distance along the X axis. The parametric lines, in combination with the vertical crossing lines, allow the hitch ball to be aligned beneath the socket without the ball guide having to ever touch the socket guide.

The sighting elements of both of the isomorphic trailer hitch alignment guides are preferably constructed of materials which produce highly visible fluorescent bright colors. Additionally, they can be electrically lighted. The extension rods on the ball guide and the socket guide are can be adjusted to appropriate lengths, and set at that desired length using a locking means. The mounting base of the ball guide has a fastening means for attaching to the towing vehicle. The mounting base of the ball guide is fitted with a pivoting-locking means which enables the extension rod of the ball guide can be rotated upward or to the side, wherein it can be set in a fixed position. The mounting base of the socket guide is also fitted with a pivoting-locking means which enables the extension rod of the socket guide to be rotated upward or to the side, wherein the female sighting element can be set in a fixed position, in alignment with the male sighting element of the ball guide.

BRIEF DESCRIPTION OF THE DRAWINGS

FIG. 4 is a frontal view of the male sighting element properly aligned with the female sighting element.

FIG. 5 is a frontal view of the male sighting element misaligned to the left of the female sighting element.

DETAILED DESCRIPTION OF THE PREFERRED ILLUSTRATED EMBODIMENT

Figure 1:
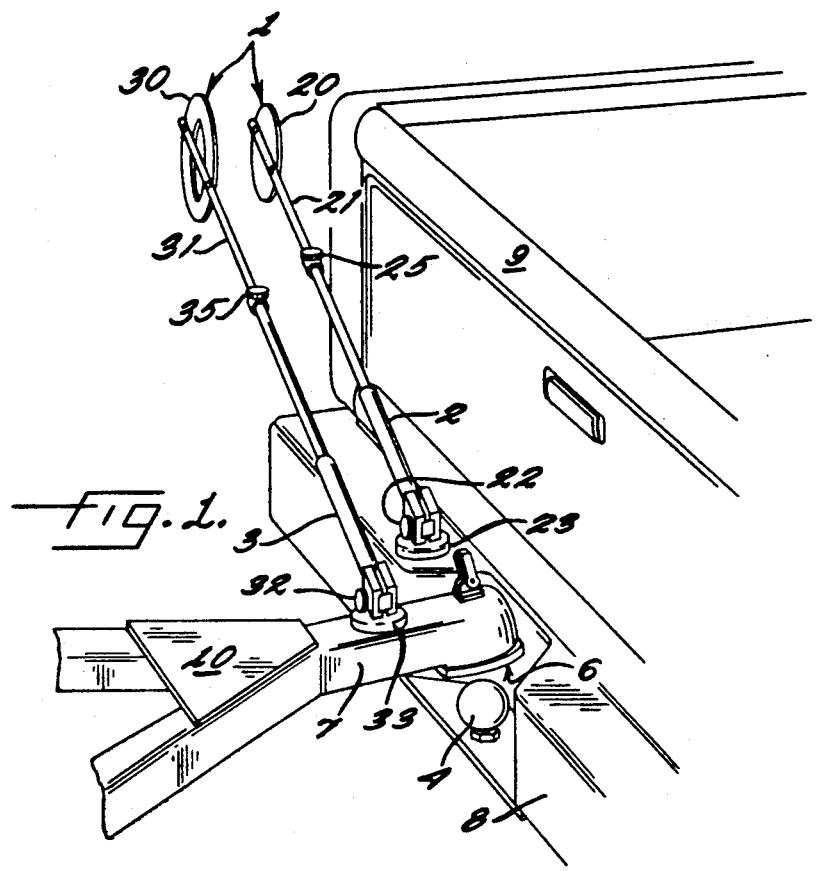
FIG. 1 is an axonometric view of the preferred illustrated embodiment, wherein a towing vehicle and towed vehicle are outfitted with an isomorphic trailer hitch alignment guide device.
Figure 2:
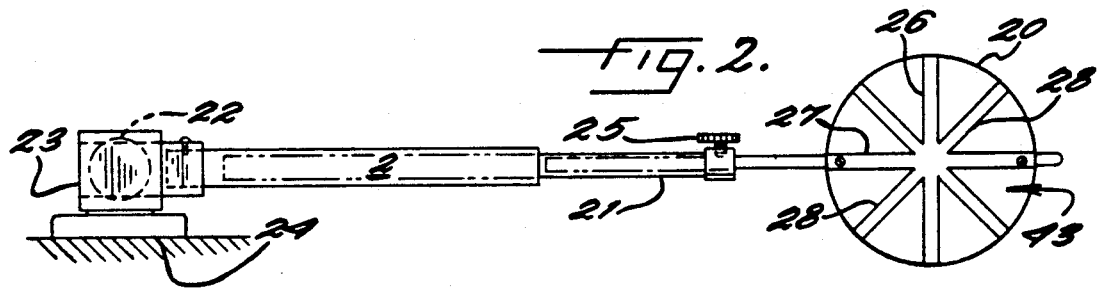
FIG. 2 is a frontal view of the ball guide.

The instant invention which is an isomorphic trailer hitch alignment guide device 1 is shown in FIG. 1. The device 1 consists of two guides, ball guide 2 and socket guide 3, wherein the ball guide 2 is mounted on the rear bumper 8 of the towing vehicle 9, and the socket guide 3 is mounted on the tongue 7 of the towed vehicle 10. Both the ball guide 2 and socket guide 3 have a sighting element, 20 and 30 respectively, located on a telescoping extension rod, 21 and 31 respectively, that extends the sighting elements into a field of view that is visible to the driver. In FIG. 1, the extension rods are angled out to the left side of the towing vehicle at a 45 degree angle to the ground. The sighting elements can be set at any angle from parallel to perpendicular to the ground, depending on the preference of the driver. The sighting elements, 20 and 30, are set in alignment, when the socket 6 of the tongue 7 is located directly above the hitch ball 4. The sighting elements are constructed to be emblematic of the hitch ball and the socket, with scribed crossing and parametric lines to emphasis the spatial qualities of their relative position. This is more easily understood through individual examination of the sighting elements. FIG. 2 is a frontal view of ball guide 2 having a mounting base 23, which is fitted with magnets 24 located in the base. The magnets enable the ball guide to be temporality, yet securely, fastened to the bumper 8 of the towing vehicle 9. The mounting base 23 supports a pivoting-locking means, which consists of a bolted clamp 22 that holds the telescoping extension rod 21. The length of the extension rod is set with a thumb set screw 25. The male sighting element 20, is a disk 43, which emblematically represents the hitch ball 4, as seen in a plan view. The disk 43 is scribed with a vertical crossing line 26, a horizontal crossing line 27, and a pair of oblique crossing lines 28. Depending on the orientation of the ball guide 2, specifically its angle with respect to the ground, the crossing lines take on a different relative spatial axis. Disk 43 is fluorescent red, and the crossing lines are fluorescent white.

Figure 3:
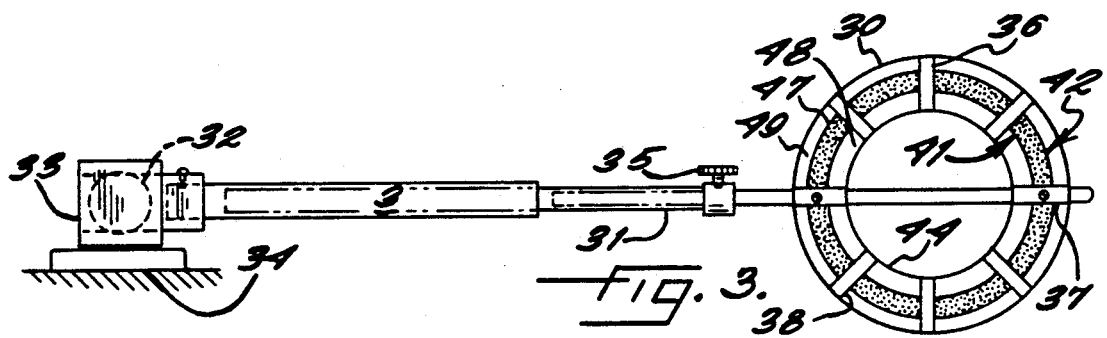
FIG. 3 is a frontal view of the socket guide.

FIG. 3 is a frontal view of socket guide 3 having a mounting base 33 which is fitted with magnets 34 located in the base. The magnets enable the socket guide to be temporarily, yet securely fastened to the tongue 7 of the towed vehicle 10. The mounting base 33 supports a pivoting-locking means, which consists of bolted clamp 32 that holds the socket guide telescoping extension rod 31. The length of the extension rod is set with a thumb set screw 35. The female sighting element 30, which is a toroid 44, that emblematically represents the socket 6 as seen in a plan view. The toroid 44 is scribed with vertical crossing line 36, horizontal crossing line 37, and a pair of oblique crossing lines 38, wherein the lines are an extension of the crossing lines originating at the epicenter of the disk 43 of the male sighting element 20. In addition to the crossing lines the toroid 44 is scribed with an inner and an outer parametric line, 41 and 42 respectively, wherein these lines are rings which define a region of where there is alignment, the alignment zone 47. FIG. 4 is a frontal view of the trailer hitch alignment guiding device 1 illustrated in FIG. 1. Note that the extension rods 21 and 31 are set at an angle roughly 45 degrees from perpendicular. The ball guide 2 is properly aligned with the socket guide 30. Observe that when viewed from the front, as seen in FIG. 4, the ball guide 2 eclipses the inner parametric line 41, and the outer parametric line 42 is just visible. The dimensions are such that, if the disk 43 appears larger than the area defined by the outer parametric line 42, then the hitch ball 4 is not yet close enough to the socket 6. On the other hand, if the disk 43 appears to be inside of the inner parametric line 41 then the ball has moved past the socket. The region of the toroid radial to the outer parametric line is the defined as the outside zone 49, and the region central to the inner parametric line 41 is defined as the inside zone 48. The alignment zone 47 substantially represents the tolerance of the socket 6 for the hitch ball 4. The female sighting element 30 is colored with fluorescent white crossing lines, a fluorescent red inside zone 48 and outside zone 49, and a fluorescent black alignment zone 47.

FIG. 5 depicts how the sighting elements will look when the trailer hitch alignment guide device 1 is mounted such that the extension rods 21 and 31 are roughly parallel to the ground, and the hitch ball of the towing vehicle is misaligned with the socket of the towed vehicle. The top and bottom and right region of the alignment zone 47 is visible, however, the left side of the region is obscured. Furthermore, the vertical crossing line 26 of the male sighting element is displaced to the left of the corresponding vertical crossing line 36 on the female sighting element. This means that the hitch ball is to the right of the socket. Front to back alignment is OK, because the top and bottom region of the alignment zone 47 is just visible.

I claim:

1. A device for facilitating the alignment and subsequent coupling of a towing vehicle to a towed vehicle, wherein the towing vehicle is equipped with a hitch having a hitch ball, and the towed vehicle is equipped with a tongue having a socket, wherein said device consists of:

a) a ball guide having a mounting base, an extension rod, and a male sighting element that is emblematic of a hitch ball; wherein said mounting base has a fastening means for attaching the ball guide to the towing vehicle, and a pivoting-locking means for seating the extension rod and setting an angle of projection of the same; wherein said extension rod has a telescoping-rotating-locking means, which enables the extension rod, which is affixed to the mounting base, to be extended to a desired length, rotated such that the male sighting element is clearly visible to a driver, and locked in position; wherein said male sighting element, which is a fitted on the end of the extension rod, has crossing lines on a frontal portion of the sighting element, wherein said crossing lines act as a visual amplification of deviations from alignment;

b) a socket guide having a mounting base, an extension rod, and a female sighting element that is emblematic of a socket; wherein said mounting base has a fastening means for attaching the socket guide to the towed vehicle, and a pivoting-locking means for seating the extension rod and setting an angle of projection of the same; wherein said extension rod has a telescoping-rotating-locking means, which enables the extension rod, which is affixed to the mounting base, to be extended to a desired length, rotated such that when the hitch ball of the towing vehicle is aligned with the socket of the towed vehicle, the female sighting element is substantially overlaid and aligned with the male sighting element; wherein said female sighting element, which is a fitted on the end of the extension rod, has crossing lines on a frontal portion of the sighting element, wherein said crossing lines, which are substantially co-extensive with the crossing lines on the male sighting element, act as a visual amplification of deviations from alignment.

2. The device as claimed in claim 1, wherein said male sighting element is disk shaped having crossing lines, wherein said crossing lines are comprised of vertical, horizontal and oblique crossing lines which converge on an epicenter of the disk.

3. The device as claimed in claim 1 wherein said female sighting element is toroid shaped having crossing lines and a pair of parametric lines, wherein said crossing lines are comprised of vertical, horizontal and oblique crossing lines which are co-extensions of the crossing lines on the male sighting element, and wherein said pair of parametric lines consist of an inner and an outer ring scribed on the frontal potion of the female sighting element, wherein said inner and outer rings define an area on the toroid which is a region of alignment, wherein, when the male sighting element is within this region of alignment, the hitch ball is aligned with the socket in all planes, 4. The device as claimed in claim 1, wherein said mounting base having a fastening means, for both the ball guide and the socket guide, where the fastening means is a base plate fitted with a magnet.

5. The device as claimed in claim 1, wherein said extension rod having a telescoping-rotating-locking means, for both the ball guide and the socket guide, is two or more tubes within tubes which can be set at a fixed length and fixed rotation with a thumb set screw.

* * * * *